(12) United States Patent
Po et al.

(10) Patent No.: US 6,959,021 B2
(45) Date of Patent: Oct. 25, 2005

(54) RAMAN FIBER LASER

(75) Inventors: Hong Po, Sherborn, MA (US); Andrey A. Demidov, Duxbury, MA (US)

(73) Assignee: OCG Technology Licensing, LLC, Columbia, MD (US)

( * ) Notice: Subject to any disclaimer, the term of this patent is extended or adjusted under 35 U.S.C. 154(b) by 0 days.

(21) Appl. No.: 10/068,433

(22) Filed: Feb. 6, 2002

(65) Prior Publication Data

US 2002/0126714 A1 Sep. 12, 2002

Related U.S. Application Data

(60) Provisional application No. 60/267,252, filed on Feb. 7, 2001.

(51) Int. Cl.$^7$ ................................................. H01S 3/30
(52) U.S. Cl. ................. 372/6; 372/3; 372/92; 372/102
(58) Field of Search ........................... 372/3, 6, 92, 102

(56) References Cited

U.S. PATENT DOCUMENTS

| | | |
|---|---|---|
| 4,063,106 A | 12/1977 | Ashkin et al. |
| 4,616,898 A | 10/1986 | Hicks, Jr. |
| 4,699,452 A | 10/1987 | Mollenauer et al. |
| 4,794,598 A | 12/1988 | Desurvire et al. |
| 4,881,790 A | 11/1989 | Mollenauer |

(Continued)

FOREIGN PATENT DOCUMENTS

| | | |
|---|---|---|
| EP | 0 954 072 | 11/1999 |
| EP | 1 018 666 | 7/2000 |
| EP | 1 124 295 | 8/2001 |
| EP | 1 225 666 A2 | 7/2002 |
| EP | 1 257 023 A2 | 11/2002 |

(Continued)

OTHER PUBLICATIONS

Chang et al.; "A novel intracavity for efficient cascaded Raman generation using WDM couplers";□□Telecommunications Baic Research Lab., Electronics and Telecommunications Research Institute□□2000.*

Chang et al.; "A Novel Intracavity For Efficient Cascaded Raman Generation Using WDM Couplers"; OFC 2001, Anaheim; WDD14–1.*

Demidov et al.; "Three–wavelength Raman fiber laser with reliable dynamic control"; Optics Letters, vol. 28, No. 17, Sep. 1, 2003, pp. 1540–1542.

Demidov et al.; "Optical Fiber Amplifier"; U.S. Appl. No. 10/771,002 filed Feb. 3, 2004.

(Continued)

*Primary Examiner*—Don Wong
*Assistant Examiner*—Leith Al-Nazer
(74) *Attorney, Agent, or Firm*—Peter J. Rainville; Sean P. Daley; Fish and Richardson P.C.

(57) ABSTRACT

Fiber laser systems. One system comprises a pump energy source, a first fiber and a WDM for transferring pump energy from the first fiber to a second fiber that comprises a grating for reflecting energy at a predetermined wavelength. The first fiber is devoid of a grating substantially reflecting energy of the predetermined wavelength. In another embodiment, a system includes a pump energy source and a fiber comprising a loop-shaped portion, a first non loop-shaped portion comprising a grating for reflecting pump energy, and a second non loop-shaped portion comprising a grating for reflecting a Stoke shifted wavelength. In another embodiment, a system includes a pump energy source and a fiber comprising a first pair of gratings for reflecting energy at a first wavelength corresponding to a first order Stoke shift, a second pair of gratings for reflecting energy at a second wavelength corresponding to a Stoke shift order greater than one, and a third pair of gratings for reflecting energy having a Stoke shift order greater than that of the second wavelength. No grating of the third pair is located between gratings of the second pair.

31 Claims, 6 Drawing Sheets

U.S. PATENT DOCUMENTS

| | | | |
|---|---|---|---|
| 5,225,925 | A | 7/1993 | Grubb et al. |
| 5,323,404 | A | 6/1994 | Grubb |
| 5,406,411 | A | 4/1995 | Button et al. |
| 5,659,644 | A | 8/1997 | DiGiovanni et al. |
| 5,673,280 | A | 9/1997 | Grubb et al. |
| 5,721,636 | A | 2/1998 | Erdogan et al. |
| 5,778,014 | A | 7/1998 | Islam |
| 5,815,518 | A | 9/1998 | Reed et al. |
| 5,838,700 | A | 11/1998 | Dianov et al. |
| 5,959,750 | A | 9/1999 | Eskildsen et al. |
| 5,966,480 | A | 10/1999 | LeGrange et al. |
| 5,982,791 | A * | 11/1999 | Sorin et al. ............ 372/25 |
| 6,052,393 | A | 4/2000 | Islam |
| 6,081,366 | A | 6/2000 | Kidorf et al. |
| 6,088,152 | A | 7/2000 | Berger et al. |
| 6,147,794 | A | 11/2000 | Stentz |
| 6,151,160 | A | 11/2000 | Ma et al. |
| 6,163,396 | A | 12/2000 | Webb |
| 6,163,552 | A | 12/2000 | Engelberth et al. |
| 6,163,554 | A * | 12/2000 | Chang et al. ............ 372/6 |
| 6,163,636 | A | 12/2000 | Stenz et al. |
| 6,181,464 | B1 | 1/2001 | Kidorf et al. |
| 6,191,877 | B1 | 2/2001 | Chraplyvy et al. |
| 6,292,288 | B1 | 9/2001 | Akasaka et al. |
| 6,310,899 | B1 | 10/2001 | Jacobovitz-Veselka |
| 6,344,925 | B1 | 2/2002 | Grubb et al. |
| 6,374,006 | B1 | 4/2002 | Islam et al. |
| 6,407,855 | B1 | 6/2002 | MacCormack et al. |
| 6,426,965 | B1 * | 7/2002 | Chang et al. ............ 372/3 |
| 6,433,920 | B1 | 8/2002 | Welch et al. |
| 6,549,329 | B2 | 4/2003 | Vail et al. |
| 6,594,288 | B1 * | 7/2003 | Putnam et al. ............ 372/3 |
| 6,603,593 | B2 | 8/2003 | Fidric et al. |
| 6,603,595 | B2 | 8/2003 | Welch et al. |
| 6,606,337 | B1 | 8/2003 | King |
| 6,621,835 | B1 | 9/2003 | Fidric |
| 6,700,696 | B2 | 3/2004 | Dominic et al. |
| 2002/0001125 | A1 * | 1/2002 | Chang et al. ........ 359/341.3 |
| 2002/0024722 | A1 | 2/2002 | Tsuzaki et al. |
| 2002/0191277 | A1 | 12/2002 | Chen et al. |
| 2003/0021302 | A1 * | 1/2003 | Grudinin et al. ............ 372/6 |
| 2003/0076577 | A1 | 4/2003 | Dominic et al. |
| 2004/0156588 | A1 | 8/2004 | Demidov et al. |
| 2004/0179797 | A1 | 9/2004 | Po et al. |

FOREIGN PATENT DOCUMENTS

| | | |
|---|---|---|
| EP | 1 309 113 A2 | 5/2003 |
| JP | 58121694 | 7/1983 |
| JP | 59165488 | 9/1984 |
| JP | 63202085 | 8/1988 |
| JP | 1196189 | 8/1989 |
| WO | WO 96/37936 | 11/1996 |
| WO | WO 99/50941 | 10/1999 |
| WO | WO 01/33285 A2 | 5/2001 |
| WO | WO 01/33285 A3 | 5/2001 |
| WO | WO 02/093704 A1 | 11/2002 |
| WO | WO 03/005068 A2 | 1/2003 |
| WO | WO 03/014771 A2 | 2/2003 |
| WO | WO 02/063728 A3 | 3/2003 |
| WO | WO 03/005068 A3 | 4/2003 |
| WO | WO 02/063728 A3 | 5/2003 |
| WO | WO 03/014771 A3 | 8/2004 |

OTHER PUBLICATIONS

Kidorf et al.; "Pump Interactions in a 100–nm Bandwidth Raman Amplifier"; IEEE Photonics Technology Letters, vol. 11, No. 5, May 1999, pp. 530–532.

Jain et al.; "A tunable multiple Stokes cw fiber Raman oscillator"; Applied Physics Letters, vol. 31, No. 2, Jul. 15, 1977, pp. 89–90.

Hill et al.; "Low–threshold cw Raman laser"; Applied Physics Letters, vol. 29, No. 3, Aug. 1, 1976, pp. 181–183.

Chang et al.; "A novel intra–cavity for efficient cascaded Raman generation using WDM couplers"; OFC 2001, Anaheim; WDD14–1.

Papernyi et al.; "Efficient dual–wavelength Raman fiber laser"; OFC 2001, Technical Digest, WDD15–1.

Mermelstein et al.; "A High–Efficiency Power–Stable Three–Wavelength Configurable Raman Fiber Laser"; OFC 2001, Anaheim, Post Deadline, PD3–1.

Chernikov et al.; "Broadband Raman amplifiers in the spectral range of 1480–1620 nm"; OFC 1999, WG6–1/117.

International Search Report dated Jul. 31, 2002.

Chang et al. "A novel intra–cavity for efficient cascaded Raman generation using WDM couplers" *Telecommunication Basic Research Lab., Electronics and Telecommunications Research Institute* 2000.

Chang et al. "Cascaded Raman fibre laser for stable dual–wavelength operation" *Electronics Letters* Jun. 7, 2001 vol. 37 No. 12.

Chang et al. "Cascaded Raman fibre laser operating at 1.48$\mu$m" *Electronics Letters* $28^{th}$ Oct. 1999 vol. 35 No. 22.

Chang et al. "Dual–wavelength cascaded Raman fibre laser" *Telecommunications Basic Research Lab., Electronics and Telecommunications Research Institute, Electronics Letters* Aug. 3, 2000, vol. 36, No. 16.

Chang et al., "Efficient cascaded Raman generation and signal amplification at 1.3 $\mu$m in $GeO_2$–doped single–mode fibre" *Optics Communications* 142 (1997) 289–293.

Chernikov et al. "High–gain monolithic cascaded Raman fiber amplifier operating at 1.3$\mu$" Monday Morning CLEO ' 95.

Chernikov et al., "High–gain monolithic cascaded fibre Raman amplifier operating at 1.3$\mu$".

Chernikov et al "Raman fibre laser operating at 1.24 $\mu$m" *Electronic Letters* Apr. 2, 1998 vol. 34 No. 7.

Dianov et al. "Three–cascaded 1407–nm Raman laser based on phosphorous–doped silica fiber" *Optics Letters*, vol. 25, No. 6 Mar. 15, 2000.

Lewis, et al. "Fibre–optic tunable Raman laser operating around 1.3$\mu$m" *Optics Communications* 182 (2000).

Persephonis, et al. Cascaded CW fibre Raman laser source 1.6–1.9$\mu$m.

Prabhu et al., "Simultaneous two–color CW Raman fiber laser with maximum output power of 1.05 W / 1239nm and 0.95 W / 1484 nm using phosphosilicate fiber" *Optics Communication* 182 (2000) 305–309.

Stenz et al., "Figure–eight fibre laser with largely unbalanced central coupler" *Electronics Letters* Aug. 4, 1994, vol. 30 No. 16.

Stenz et al. "Polarization effects and nonlinear switching in fiber figure–eight lasers" *Optics Letters* vol. 19, No. 18, Sep. 15, 1994.

Xu et al., "Output characteristics of a fibre Raman laser with a composite $GeO_2$ and $P_2O_5$–doped silica fibre" *Journal of Modern Optics*, 2001, vol. 48, No. 7,1269–1279.

* cited by examiner

RAMAN FIBER LASER

CROSS-REFERENCE TO RELATED APPLICATION

This application claims priority under 35 USC §119(e) to U.S. Provisional Patent Application Ser. No. 60/267,252, filed on Feb. 7, 2001, and entitled "Raman Fiber Laser", the entire contents of which are hereby incorporated by reference.

TECHNICAL FIELD

The invention relates to Raman fiber lasers, and systems containing Raman fiber lasers.

BACKGROUND

In general, Raman fiber lasers include a pump source coupled to a fiber, such as an optical fiber. Energy emitted from the pump source at a certain wavelength $\lambda_p$, commonly referred to as the pump energy, is coupled into the fiber. As the pump energy interacts with the material from which the fiber is made, one or more Raman Stoke transitions can occur within the fiber, resulting in the formation of energy within the fiber at wavelengths corresponding to the Raman Stoke shifts that occur (e.g., $\lambda_{s1}$, $\lambda_{s2}$, $\lambda_{s3}$, $\lambda_{s4}$, etc.).

Typically, the fiber is designed so that the energy formed at one or more Raman Stoke shifts is substantially confined within the fiber. This can enhance the formation of energy within the fiber at one or more higher order Raman Stoke shifts. Often, the fiber is also designed so that at least a portion of the energy at wavelengths corresponding to predetermined, higher order Raman Stoke shifts (e.g., $\lambda_{sx}$, where x is equal to or greater than one) is allowed to exit the fiber. The energy at the wavelengths $\lambda_{sx}$ can be used, for example, to enhance the signal in an optical fiber.

SUMMARY

In general, one aspect of the invention features a system including an energy source, two fibers, a WDM and a fiber Bragg grating. The first fiber is coupled to the energy source so that pump energy from the energy source can be transferred to the first fiber. The WDM is capable of transferring the pump energy from the first fiber to the second fiber. The fiber Bragg grating is in the second fiber, and is capable of substantially reflecting energy at a predetermined wavelength. The first fiber is devoid of a fiber Bragg grating capable of substantially reflecting energy at the predetermined wavelength.

In general, another aspect of the invention features a system including an energy source, a fiber coupled to the energy source so that the pump energy can be transferred from the energy source to the fiber, and two fiber Bragg gratings. The fiber having a loop-shaped portion, a first non loop-shaped portion, and a second non loop-shaped portion. The first fiber Bragg grating is in the first non loop-shaped portion of the fiber, and is capable of substantially reflecting the pump energy. The second fiber Bragg grating is in the second non loop-shaped portion of the fiber, and is capable of substantially reflecting energy having a wavelength comprising a Stoke shifted wavelength.

In general, a further aspect of the invention features a system including an energy source, a fiber coupled to the energy source so that the pump energy from the energy source can be transferred to the fiber, and three pairs of fiber Bragg gratings. The gratings within each pair are capable of substantially reflecting energy at a same wavelength. That wavelength corresponds to Stoke shifted energy of a particular order. In some embodiments, for each pair of gratings the order is different. For certain embodiments, for each pair of gratings, the order may be the same, but the wavelength may be different (e.g., if there is a bandwidth associated with a given order). The pairs of gratings are arranged so that at least two of the pairs are in series with respect to each other.

Features, objects, and advantages of the invention are in the description and drawings, and from the claims.

DETAILED DESCRIPTION

Figure 1:
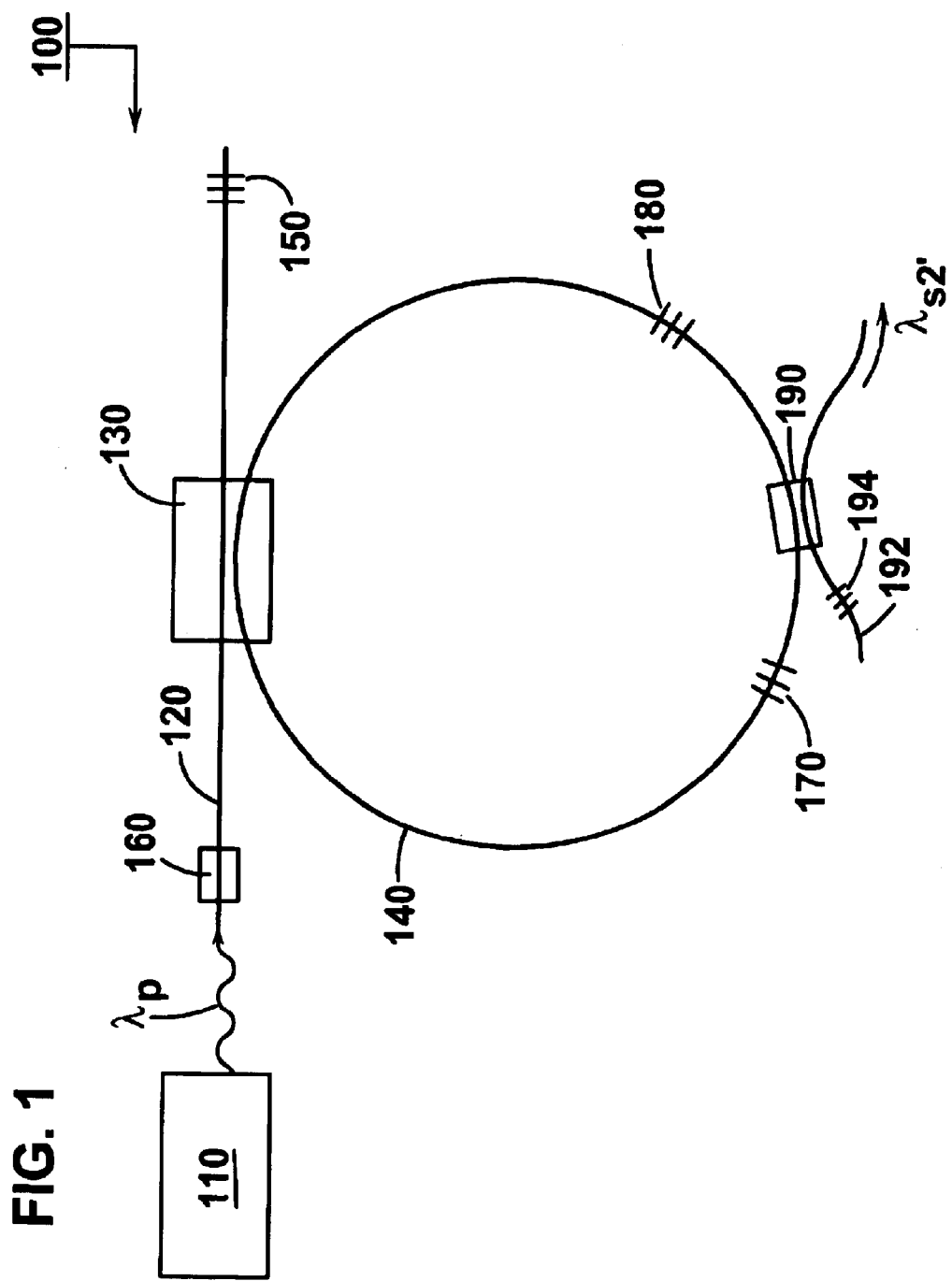
FIG. 1 is a schematic view of an embodiment of a Raman fiber laser system.

FIG. 1 is a schematic view of a Raman fiber laser system 100, including an energy source 110 coupled to a fiber 120 so that pump energy $\lambda_p$ emitted by source 110 enters fiber 120 after passing through a device 160 (e.g., an optical isolator (circulator)). The pump energy propagating in fiber 120 encounters a wavelength division multiplexer (WDM) 130 that transfers a substantial amount (e.g., up to about 100%) of the pump energy into a loop-shaped fiber 140. This pump energy propagates clockwise in the fiber 140 and encounters WDM 130, which can transfer pump energy with high (e.g., about 100%) efficiency from fiber 140 to fiber 120 in the direction toward Bragg grating 150. Grating 150 has a high (e.g., about 100%) reflectivity at $\lambda_p$, thereby reversing the direction of propagation of the pump energy in fiber 120. The reflected pump energy propagates in fiber 120 and encounters WDM 130 where a substantial amount (e.g., up to 100%) of the pump energy is transferred from fiber 120 to loop-shaped fiber 140. This transferred pump energy propagates in fiber 140 in a counter clockwise direction. The pump energy that propagates counter clockwise in fiber 140 encounters WDM 130 and is transferred to fiber 120 with high (e.g., up to about 100%) efficiency and propagates toward device 160, which is designed to substantially isolate the pump energy from source 110 and/or substantially remove the residual pump energy from system 100.

With this design, the pump energy in fiber 140 propagates in both the clockwise and the counter clockwise directions. As the pump energy propagates in fiber 140, it interacts with the fiber material and generates the first Raman Stoke shift $\lambda_{s1}$ via stimulated Raman scattering process. Energy at wavelength $\lambda_{s1}$ circulates in fiber 140 both clockwise and counter clockwise, and substantially no energy at wavelength $\lambda_{s1}$ escapes fiber 140 via WDM 130.

Energy at wavelength $\lambda_{s1}$ can act as a source for generation of the second order Raman Stoke shift at the wavelength $\lambda_{s2}$ through the stimulated Raman process. WDM 130 transfers substantially no energy at $\lambda_{s2}$ from fiber 140 to fiber 120, allowing energy at $\lambda_{s2}$ to propagate both clockwise and counter clockwise. In some embodiments, Bragg gratings 170 and/or 180 are designed so that they reflect substantially all (e.g., about 100%) energy impinging thereon at $\lambda_{s2}$. In certain embodiments, gratings 170 and/or 180 are designed so that they have lower (e.g., less than about 100%) reflectivities at $\lambda_{s2}$. For example, in embodiments, grating 180 can reflect substantially all (e.g., about 100%) energy impinging thereon at $\lambda_{s2}$, and grating 170 can have a lower (e.g., less than about 100%) reflectivity at $\lambda_{s2}$. In embodiments, gratings 170 and/or 180 can be substantially (e.g., about 100%) transparent for certain wavelengths (e.g., $\lambda_p$ and/or $\lambda_{s1}$).

In certain embodiments, gratings 170 and/or 180 have a narrow bandwidth to define the precise position of the wavelength $\lambda_{s2'}$ within the allowed bandwidth of the second Raznan Stoke shift. In some embodiments, at the wavelength $\lambda_{s2'}$, Bragg grating 180 has a high reflectivity (e.g., about 100%), whereas grating 170 has a lower reflectivity (e.g., less than about 100%). Energy at wavelength $\lambda_{s2'}$ can circulate in fiber 140 by reflecting between gratings 170 and 180. In some embodiments, WDM 130 is designed so that substantially no energy at wavelengths $\lambda_{s1}$ and $\lambda_{s2'}$ is transferred from fiber 140 to fiber 120. In these embodiments, energy at wavelengths $\lambda_{s1}$ and $\lambda_{s2'}$ can repeatedly propagate in fiber 140 in both the clockwise and counter clockwise directions, thereby enhancing the intensity energy at $\lambda_{s1}$ and $\lambda_{s2'}$ within fiber 140.

System 100 also includes a WDM 190 between gratings 170 and 180. WDM 190 can transfer some (e.g., about 100% or less) of the energy of the second order Raman shift $\lambda_{s2'}$ from fiber 140 to fiber 192. In some embodiments, WDM transfers substantially no energy at $\lambda_p$ or $\lambda_{s1}$. In certain embodiments, WDM 190 introduces losses in the bandwidth of the second Raman Stoke shift. Losses introduced by WDM 190 can suppress wavelengths that are not confined with $\lambda_{s2'}$, allowing selective amplification of the energy intensity at $\lambda_{s2'}$. In certain embodiments, the position (e.g., the exact position) and/or the bandwidth of the signal at $\lambda_{s2'}$ are defined by the gratings 170 and 180. In certain embodiments, gratings 170 and/or 180 can be tunable, thereby allowing the spectral properties of the energy at $\lambda_{s2'}$ to be tunable as well. Gratings 170 and/or 180 can be narrow bandwidth gratings. In some embodiments, grating 170 or 180 is a narrow bandwith grating and the other grating is a broad bandwidth grating. The amount of energy at wavelength $\lambda_{s2'}$ transferred to the output fiber 192 can be controlled by the reflectivity of gratings 170 and 180, and the coupling efficiency of WDM 190 and can be adjusted as desired.

In some embodiments, such as, for example, when grating 180 has a high (e.g., about 100%) reflectivity, the energy at $\lambda_{s2'}$ transferred from fiber 140 to fiber 192 through the WDM 190 is predominantly in a direction shown by the arrow in FIG. 1. In embodiments in which grating 180 does not have a high (e.g., about 100%) reflectivity there can be energy transfer from fiber 140 to fiber 192 at $\lambda_{s2'}$ in the opposite direction via WDM 190. In these embodiments, energy at $\lambda_{s2'}$ is transferred from fiber 140 to fiber 192 via WDM 190 in both directions. Fiber 192 optionally includes a fiber Bragg grating 194 designed to substantially reflect energy at wavelength $\lambda_{s2'}$, thereby allowing the majority of the energy at $\lambda_{s2'}$ transferred to fiber 192 from fiber 140 to ultimately propagate through fiber 192 in one direction.

Although the system shown in FIG. 1 includes only two fiber Bragg gratings in loop-shaped fiber 140, additional fiber Bragg gratings can be included within fiber 140. The additional fiber Bragg gratings can be used, for example, to substantially reflect energy propagating in fiber 140 at wavelengths corresponding to higher order Stoke transitions (e.g., $\lambda_{s3}$, $\lambda_{s4}$, $\lambda_{s5}$, $\lambda_{s6}$, $\lambda_{s7}$, etc.). Alternatively or additionally, the additional fiber Bragg gratings can be used to substantially reflect energy propagating in fiber 140 at different wavelengths within a given Raman Stoke order (e.g., $\lambda_{s2'}$, $\lambda_{s2''}$, $\lambda_{s2'''}$, $\lambda_{s2''''}$, ..., $\lambda_{s3'}$, $\lambda_{s3''}$, $\lambda_{s3'''}$, $\lambda_{s3''''}$, etc.). Such wavelengths within a given Raman Stoke order can result from the existence of bandwidth for the Raman Stoke order shifts. Fiber 140 can further include one or more WDMs for transferring energy at different wavelengths (e.g., at wavelengths corresponding to different order Stoke shifts) to fiber 192 and/or additional fibers. Alternatively, fiber 140 may contain one or more Bragg gratings having high reflectivity at Raman shift orders rather than pairs of gratings.

Figure 2:
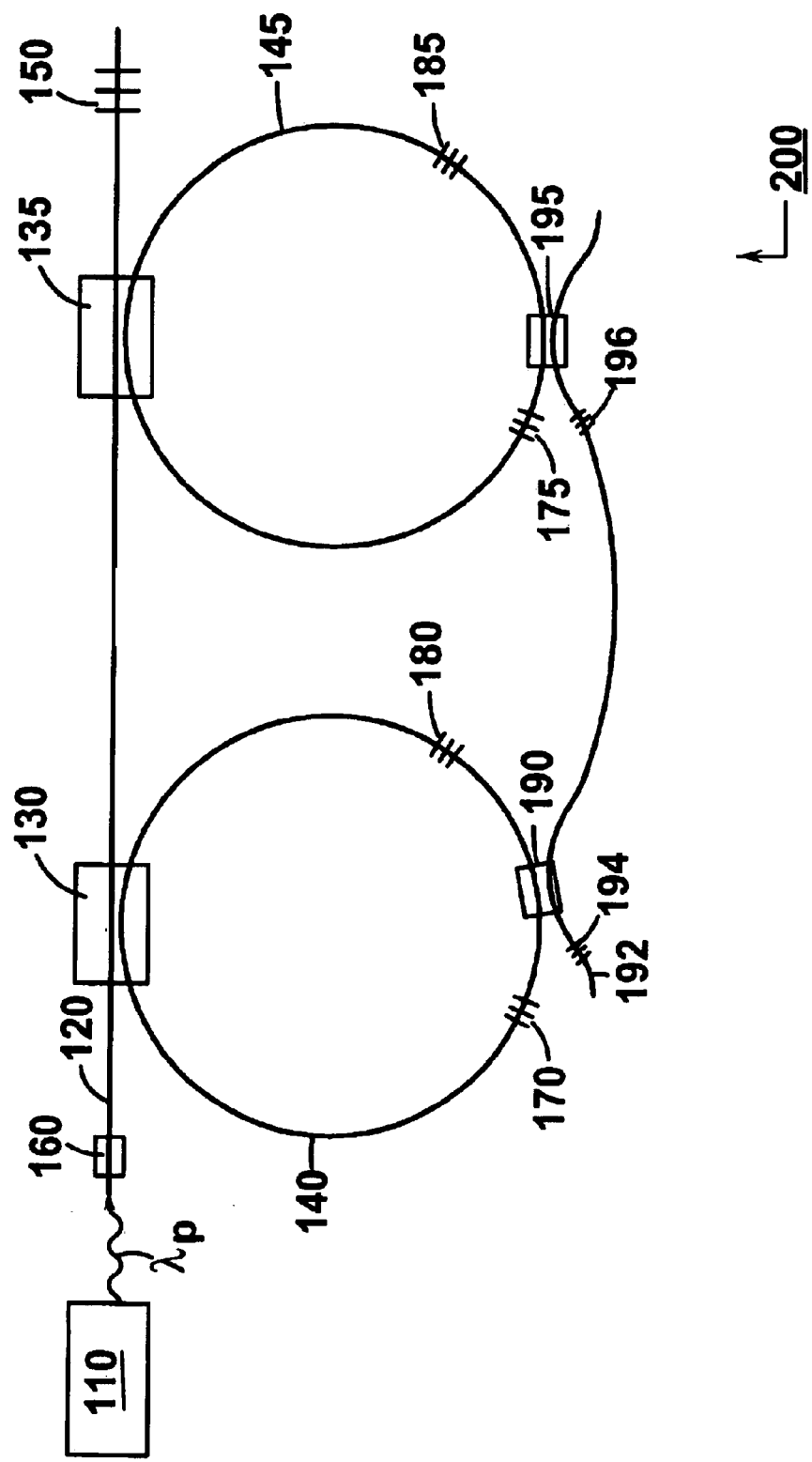
FIG. 2 is a schematic view of an embodiment of a Raman fiber laser system.

FIG. 2 is a schematic view of a Raman fiber laser system 200 which includes energy source 110, fiber 120 and grating 150. In certain embodiments, grating 150 has maximum reflectivity at the pump wavelength $\lambda_p$. System 200 also includes loop-shaped fibers 140 and 145, and corresponding WDMs 130 and 135, respectively. Fiber 140 includes gratings 170 and 180, and coupler 190. Fiber 145 includes gratings 175 and 185, and coupler 195. WDM 135 allows pump energy to be transferred between fiber 120 and fiber 145 so that pump energy can propagate through fiber 145 in both the clockwise and counter clockwise directions.

In certain embodiments, the path of pump energy propagation is as follows. After passing device 160, pump energy $\lambda_p$ propagates through fiber 120 until it encounters WDM 130, then at least a portion of the pump energy is transferred to loop-shaped fiber 140 and propagates therethrough in the clockwise direction. When the pump energy reaches WDM 130 it can be transferred to fiber 120 and propagate the toward WDM 135. WDM 135 transfers at least a portion of the pump energy from fiber 120 to loop-shaped fiber 145, where the pump energy propagates in the clockwise direction. The pump energy can be transferred from fiber 145 to fiber 120 via WDM 135 and propagate toward the grating 150. Grating 150 substantially reflects the pump energy, resulting in propagation of the pump energy in the opposite direction. This also results in counter clockwise propagation of the pump energy in fibers 145 and 140. The residual pump energy that is not converted into Raman shifted signals can be terminated (e.g., removed from system 200) via device 160.

An advantage of system 200 is that energy at different wavelengths (e.g., $\lambda_{s2'}$ and $\lambda_{s2''}$), confined within the bandwidth of the second order Raman shift $\lambda_{s2}$, can be produced in fibers 140 and 145, respectively, by selecting appropriate gratings (e.g. by selecting gratings 170 and 180 so that they substantially reflect energy at $\lambda_{s2'}$, and gratings 175 and 185 so that they substantially reflect energy at $\lambda_{s2''}$).

In some embodiments, fiber 192 optionally includes a fiber Bragg grating 196 that substantially reflects energy at wavelength $\lambda_{s2''}$. In certain embodiments, the signals at wavelengths $\lambda_{s2'}$ and $\lambda_{s2''}$ can be combined in fiber 192 via WDMs 190 and 195 or other types of multiplexing.

An advantage for the system shown in FIG. 2 is that the coupling of energy formed at the different wavelengths, $\lambda_{s2'}$ and $\lambda_{s2''}$, as well as their exact spectral parameters, can be individually manipulated so that the energy formed at the different wavelengths can have predetermined intensities, such as for example, substantially the same intensity (e.g., flat Raman gain). This can be desirable, for example, when system 200 is used to pump an optical fiber that advantageously utilizes a flat Raman optical gain in a relatively broad bandwidth.

Although the system shown in FIG. 2 contains only two loop-shaped fibers coupled to fiber 120, the system can include additional loop-shaped fibers coupled to fibers 120 and optionally 192. Each loop-shaped fiber can be designed, for example, to confine energy at a particular wavelength $\lambda_{s2(x)}$ within the loop-shaped fiber. The wavelengths can be the same or different. The energies can correspond to different Raman Stoke shifts and/or different wavelength selection within a given Raman Stoke shift (e.g., when the Raman Stoke shift has a nonzero bandwidth, such as an appreciable bandwidth). Each loop-shaped fiber can also include, for example, a WDM to remove the energy at the particular wavelength from the fiber and transfer it to one or more different fibers. The one or more fibers can each include one or more fiber Bragg gratings that substantially reflect energy propagating therein. Typically, the loops are coupled to fiber 120 between source 110 and grating 150.

Figure 3:
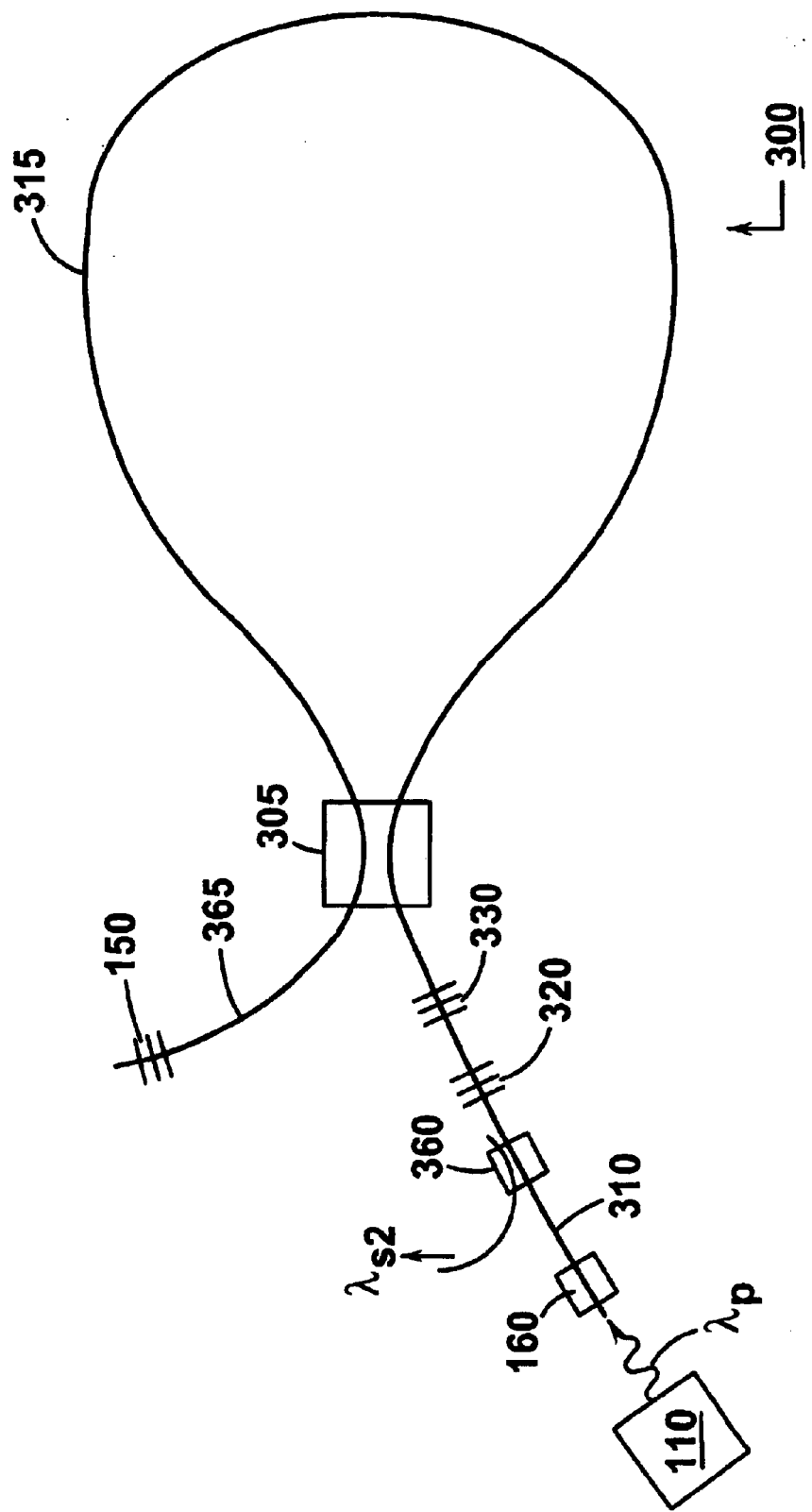
FIG. 3 is a schematic view of an embodiment of a Raman fiber laser system.

FIG. 3 is a schematic view of a Raman fiber laser system 300 that includes energy source 110 and a fiber 310 with a loop-shaped portion 315. Pump energy emitted by source 110 is coupled to fiber 310 and propagates in fiber 310 and then in a loop-shaped fiber 315 in clockwise and counter clockwise directions through a coupler (e.g., a broadband coupler, such as a 50%×50% broadband coupler) 305. WDM 360 as well as Bragg gratings 320 and 330 are substantially transparent to the pump energy, and device 160 substantially prevents pump energy from propagating back to energy source 110.

Using a splitting ratio of 50%×50% for coupler 305 results in substantially no energy propagating in fiber 315 transferring to fiber 365. Considering that this requirement may not be achievable in a broad wavelength region and in some other cases, the portion of energy at the pump and/or Raman shifted wavelengths may exit intothe fiber 365 and reach the broadband reflector 150. The reflector 150 reverses direction of energy propagation and reflects it back to the 315 loop-fiber through the fiber 365 and coupler 305. Finally, all energy launched in the fiber 315 is reflected back in the fiber 310.

Fiber 310 includes fiber Bragg gratings 320 and 330 designed to substantially reflect the direction of propagation of energy propagating in fiber 310 at wavelengths $\lambda_{s1}$ and $\lambda_{s2}$ corresponding to the first and second order Raman Stoke shifts, respectively, for the material from which fiber 315 is formed. This results in energy generation at wavelengths $\lambda_{s1}$ and $\lambda_{s2}$ propagating in the loop-fiber 315 in both the clockwise and the counter clockwise directions. Grating 320 has a high (e.g., about 100%) reflectivity at $\lambda_{s1}$. Grating 330 is designed so that only a portion of the energy at $\lambda_{s2}$ is reflected therefrom, allowing some of the energy at this wavelength to be transferred from fiber 310 via coupler 360. For example, coupler 360 can transfer energy at $\lambda_{s2}$ to an output optical fiber. In some embodiments, the intensity of an output Raman signal can be controlled by the reflectivity of Bragg grating 330 and coupling efficiency of WDM 360. The sequence of gratings 320 and 330 can be as shown in FIG. 3 or in the reverse order.

Although one configuration of system 300 is shown in FIG. 3, various alternatives and/or additions can be made to this system. For example, additional fiber Bragg gratings can be added to fiber 310 to substantially reflect different wavelengths, at least some of which can correspond to different order Stoke shifted wavelengths, whereas others can correspond to wavelengths inside the bandwidth of the Raman gain of the same order. The system shown in FIG. 3 can be cascaded to generate multiple wavelengths (e.g., $\lambda_{s2}$, $\lambda_{s2'}$, $\lambda_{s2''}$ etc.) using the principles described herein.

Figure 4:
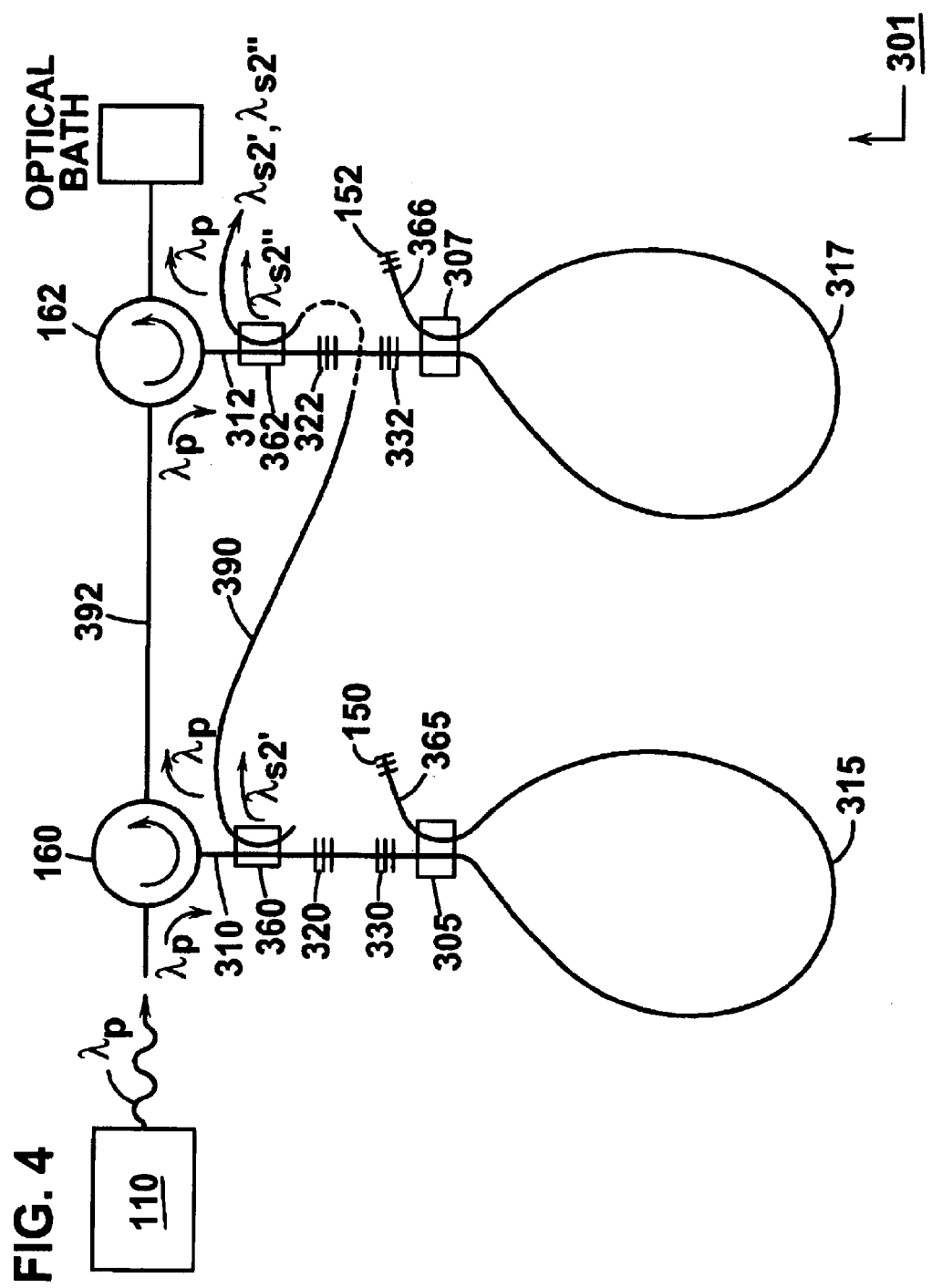
FIG. 4 is a schematic view of an embodiment of a Raman fiber laser system.
Figure 5:
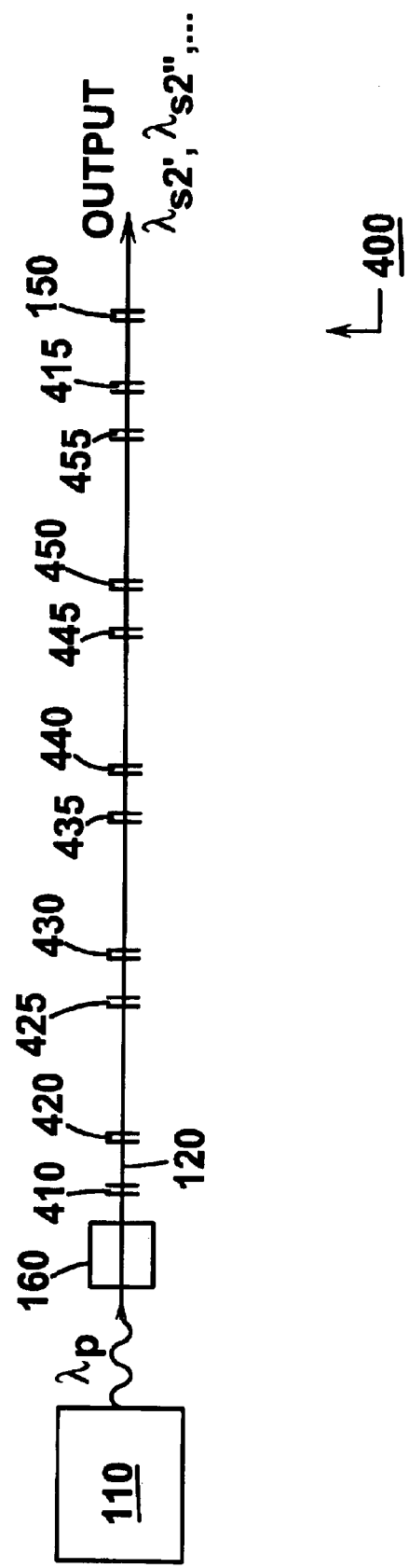
FIG. 5 is a schematic view of an embodiment of a Raman fiber laser system.

FIG. 4 shows a cascaded laser system 301, including an optical circulator 162, a fiber 312, a WDM 362, Bragg gratings 322 and 332, a coupler 307 (e.g., a broadband coupler, such as a broadband 50%×50% coupler), a loop-shaped fiber with Raman active material 317, a fiber 366 and a terminal broadband reflector 152. In certain embodiments, some or all of these elements can be similar to those described above with respect to system 300. In some embodiments, the optical circulators can be used as follows. Circulator 160 directs pump energy into the first Raman cascade and then it redirects the backward propagated energy toward the optical circulator 162. Optical circulator 162 directs pump energy into the second Raman cascade and then redirects the backward propagated pump energy into optical bath for disposal or it can direct it to the next cascade. The number of cascades can be more than two. Each cascade can generate its own wavelength $\lambda_{s2}$, (e.g., the first cascade —$\lambda_{s2'}$, the second —$_{s2''}$ etc.). Energy at these wavelengths can be transferred via the respective WDMs 360, 362 etc. The WDMs can be connected with the common fiber 390 and provide the combined set of wavelengths $\lambda_{s2'}$, $\lambda_{s2''}$ etc. at its terminal end. Intensities of energy at the latter wavelengths can be regulated via coupling efficiencies of the output couplers. FIG. 5 is a schematic view of a Raman fiber laser system 400 including an energy source 110 and a fiber 120. System 400 includes pairs of fiber Bragg gratings (410/415, 420/425, 430/435, 440/445, 450/455) and a Bragg grating 150, which has a high (e.g., about 100%) reflectivity at the pump wavelength $\lambda_p$. The fiber Bragg gratings within any particular pair can substantially reflect energy at the same wavelength. For example, gratings 410 and 415 can substantially reflect energy propagating in fiber 120 at the first order Raman Stoke shift $\lambda_{s1}$. Certain pairs of gratings (e.g., 430/435) are arranged so that there are no dissimilar gratings therebetween. With this arrangement, energy propagating in fiber 120 at the wavelength reflected by these gratings is confined to the region in fiber 120 between the gratings (e.g., 430/435). If desired, a coupler can be included in system 400 50 that energy at this wavelength can be transferred from fiber 120 (e.g., to an optical fiber for pumping).

Grating pairs 420/425, 430/435, 440/445, 450/455 (tandem grating pairs) are disposed between (nested between) grating pair 410/415 (nesting grating pair). Grating pairs 420/425, 430/435 etc. are disposed in fiber 120 in tandem and the wavelengths of maximum reflectivity corresponding to individual grating pairs are, for example, located in the bandwidth of the second order Raman stoke shift $\lambda_{s2}$ and denoted as $\lambda_{s2'}$, $\lambda_{s2''}$, $\lambda_{s2'''}$, $\lambda_{s2''''}$ respectively. In certain embodiments, the reflectivity of gratings 425, 435, 445 and 455 at wavelengths $\lambda_{s2'}$, $\lambda_{s2''}$, $\lambda_{s2'''}$, $\lambda_{s2''''}$ is less than 100%. In these embodiments, energy at these wavelengths can pass through these gratings and propagate along fiber 120 toward terminal grating 150, which is substantially transparent for these wavelengths. The energy output contains a set of wavelengths $\lambda_{s2'}$, $\lambda_{s2''}$, $\lambda_{s2'''}$, $\lambda_{s2''''}$. The intensities of these Raman signals can be regulated by a proper selection of Bragg grating parameters as well as parameters of fiber 120 material.

Although system 400 is shown as having four tandem pairs of gratings (420/425, 430/435, 440/445 and 450/455), embodiments having greater or fewer tandem pairs of gratings are contemplated. System 400 can have, for example, one, two, three, five, six, seven, eight, nine, 10, or more tandem pairs of gratings. Each pair of tandem gratings can be designed to have maximum reflectivity corresponding to an energy level (e.g, $\lambda_{s2'}$, $\lambda_{s2''}$, $\lambda_{s2'''}$, $\lambda_{s2''''}$, $\lambda_{s2'''''}$, etc.) within the bandwidth of a given Raman stoke shift (e.g. $\lambda_{s2}$).

Moreover, although system 400 is shown as having only one nesting grating pair, other embodiments are contemplated. For example, system 400 can include an additional nesting grating pair with one of the gratings disposed between device 160 and grating 410, and the other grating disposed between gratings 415 and 150. Alternatively or additionally, system 400 can have a nesting grating pair with one of the gratings disposed between gratings 410 and 420, and the other grating disposed between gratings 455 and 415. In general, the gratings within a particular nesting grating pair are designed to have maximum reflectivity corresponding to energy at a particular Raman stoke shift (e.g., $\lambda_{s3}$, $\lambda_{s4}$, $\lambda_{s5}$, $\lambda_{s6}$, $\lambda_{s7}$, $\lambda_{s8}$, $\lambda_{s9}$, $\lambda_{s10}$, etc.).

An advantage of the arrangement of system 400 is that it can result in reduced intensity sharing and cross-talk between energy propagating in fiber 120 at different wavelengths because the energy at these different wavelengths is confined to different regions of fiber 120. This can allow for improved control of the intensity distribution in fiber 120 as a function of wavelength. In some embodiments, the intensity distribution can be substantially the same for predetermined wavelengths, such as certain wavelengths of interest.

Figure 6:
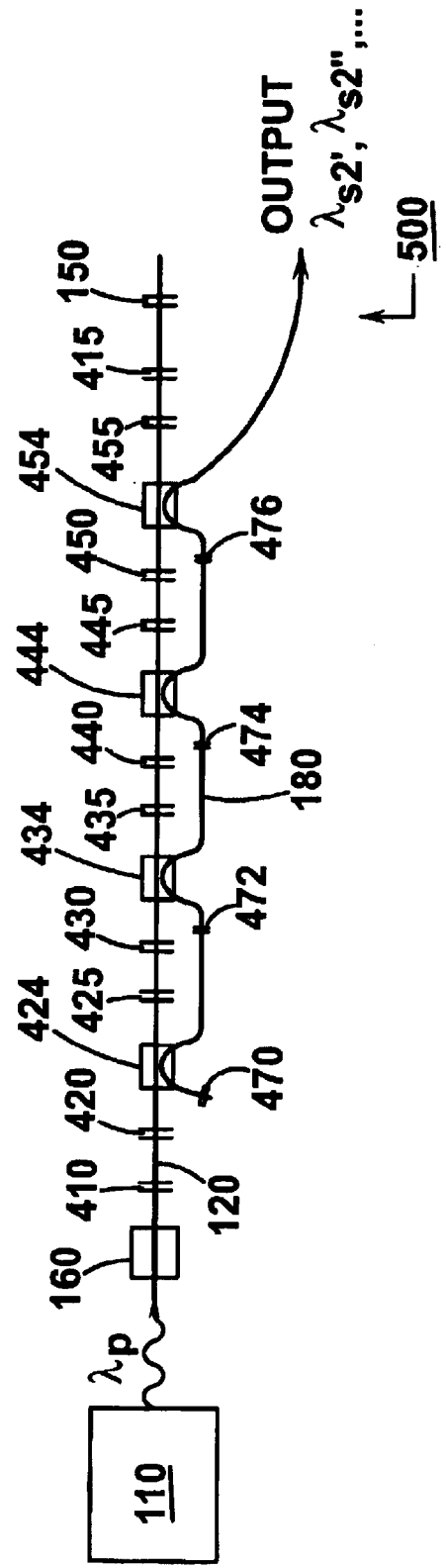
FIG. 6 is a schematic view of an embodiment of a Raman fiber laser system.

FIG. 6 shows a schematic of system 500. The tandem grating pairs (420/425, 430/435, 440/445, 450/455) can all have, for example, a high (e.g., about 100%) reflectivity at certain wavelengths (e.g., $\lambda_{s2'}$, $\lambda_{s2''}$, $\lambda_{s2'''}$, $\lambda_{s2''''}$).Energy transfer at wavelengths $\lambda_{s2'}$, $\lambda_{s2''}$, $\lambda_{s2'''}$, $\lambda_{s2''''}$ is conducted via WDM 424, 434, 444, 454, respectively, disposed between corresponding gratings and connected with fiber 180. The coupling efficiencies of the WDMs can be substantially less than 100% and can be appropriately set to obtain a predefined intensity distribution of output energies at the wavelengths $\lambda_{s2'}$, $\lambda_{s2''}$, $\lambda_{s2'''}$, $\lambda_{s2''''}$.(e.g., a substantially flat intensity distribution at these wavelengths). In some embodiments, one of the terminals of fiber 180 can optionally have reflector 470 and/or reflectors 472, 474, 476 that would facilitate the delivery of output energy to the right side terminal of the fiber 180. In certain embodiments, system 500 can have two output ports for energy at wavelengths $\lambda_{s2'}$, $\lambda_{s2''}$, $\lambda_{s2'''}$, $\lambda_{s2''''}$ through the left and right terminals of fiber 180.

The WDMs in system 500 are not limited to being disposed only between matching Bragg gratings 420/425, 430/435, 440/445, 450/455 as shown in FIG. 6. The WDMs can also be placed between grating pairs, e.g., in space between 425 and 430 etc., or in any combinations of the above.

Although certain embodiments have been described herein, the invention is not limited to these embodiments. For example, in some embodiments, multiple pump sources can be used. For example, a multiple pump source (e.g., with wavelengths $\lambda_{p1}$, $\lambda_{p2}$, $\lambda_{p3}$ etc.) can be used to assist in providing a predetermined Raman gain spectrum (e.g., a relatively flat Raman gain spectrum). Moreover, while systems have been described as including WDMs, other appropriate couplers may also be used. Other embodiments are in the claims.

What is claimed is:

1. A fiber laser system, comprising:
   an energy source;
   a first fiber coupled to the energy source so that pump energy from the energy source can be transferred to the first fiber;
   a second fiber, said second fiber comprising a loop;
   a WDM capable of transferring the pump energy from the first fiber to the second fiber; and
   said loop of said second fiber comprising a fiber Bragg grating capable of substantially reflecting energy at a wavelength, wherein the first fiber is devoid of a reflector substantially reflecting energy at the wavelength.

2. The system of claim 1, wherein the second fiber is in the shape of a circular loop.

3. The system of claim 1, wherein the wavelength comprises energy having a Stoke shifted wavelength.

4. The system of claim 3, wherein the Stoke shifted wavelength has an order greater than one.

5. The system of claim 4, wherein the order is two.

6. The system of claim 4, wherein the order is three.

7. The system of claim 4, wherein the order is four.

8. The system of claim 4, wherein the order is five.

9. The system of claim 1, further comprising a second fiber Bragg grating in the second fiber, the second fiber Bragg grating being capable of substantially reflecting energy at a second wavelength different than the wavelength, wherein the first fiber is devoid of a fiber Bragg grating capable of substantially reflecting energy at the second wavelength.

10. The system of claim 1, further comprising: a third fiber, a second WDM, and a second fiber Bragg grating being capable of substantially reflecting energy at a second wavelength different than the wavelength, the second fiber Bragg grating being in the third fiber, the second WDM being capable of transferring pump energy between the first and third fibers.

11. The system of claim 10, wherein the third fiber is in the shape of a loop.

12. The system of claim 10, wherein the third fiber is in the shape of a circular loop.

13. The system of claim 10, wherein the second wavelength comprises energy having a Stoke shifted wavelength.

14. The system of claim 10, further comprising a third fiber Bragg grating capable of substantially reflecting the pump energy, the third fiber Bragg grating being in the first fiber.

15. The system of claim 14, wherein the second WDM is between the energy source and the third fiber Bragg grating.

16. The system of claim 1, further comprising a second fiber Bragg grating capable of substantially reflecting the pump energy, the second fiber Bragg grating being in the first fiber.

17. The system of claim 16, wherein the WDM is between the energy source and the second fiber Bragg grating.

18. The system of claim 1, further comprising a coupler and a third fiber, the coupler being capable of transfering energy having the wavelength from the second fiber to the third fiber.

19. The system of claim 18, further comprising a second fiber Bragg grating in the third fiber, the second fiber Bragg grating being capable of substantially reflecting the energy having the wavelength.

20. The system of claim 1 wherein said first fiber is non-loop shaped.

21. The system of claim 1 wherein the wavelength comprises energy having a Stoke shifted wavelength, and wherein said WDM transfers substantially no energy at said Stoke shifted wavelength from said second fiber to said first fiber and transfers substantially no energy at a different Stoke shifted wavelength having a different order than said Stoke shifted wavelength from said second fiber to said first fiber.

22. The system of claim 1 wherein said first fiber being devoid of said reflector includes said first fiber being devoid of said reflector between said energy source and said WDM.

23. A fiber laser system, comprising:

an energy source capable of producing pump energy;

a fiber coupled to the energy source so that the pump energy can be transferred from the energy source to the fiber, the fiber having a loop-shaped portion, a first non loop-shaped portion, and a second non loop-shaped portion;

a first fiber Bragg grating in the first non loop-shaped portion of the fiber, the first fiber Bragg grating being capable of substantially reflecting energy comprising a Stoke shifted wavelength;

a second fiber Bragg grating in the second non loop-shaped portion of the fiber, the second fiber Bragg grating being capable of substantially reflecting energy having a wavelength comprising the Stoke shifted wavelength.

24. The system of claim 23, further comprising a third fiber Bragg grating in the second non-loop shaped portion of the fiber, the third fiber Bragg grating being capable of substantially reflecting energy having a wavelength comprising a second Stoke shifted wavelength.

25. The system of claim 24, further comprising a fourth fiber Bragg grating in the second non loop-shaped portion of the fiber, the fourth fiber Bragg grating being capable of substantially reflecting energy having a wavelength comprising a third Stoke shifted wavelength.

26. The system of claim 23, further comprising a coupler and a second fiber, the coupler being capable of transferring energy having a first wavelength from the first fiber to the second fiber.

27. The system of claim 26, wherein the first wavelength comprises the Stoke shifted wavelength.

28. The system of claim 23, wherein the first Bragg grating is capable of substantially reflecting the pump energy.

29. A fiber laser system, comprising:

an energy source capable of producing pump energy;

a fiber coupled to the energy source so that the pump energy from the energy source can be transferred to the fiber;

a first pair of fiber Bragg gratings in the fiber, the gratings in the first pair being capable of substantially reflecting energy at a first wavelength corresponding to a first order Stoke shifted energy;

a second pair of gratings in the fiber, the gratings in the second pair being capable of substantially reflecting energy at a second wavelength corresponding to an order of Stoke shifted energy that is greater than one; and a third pair of gratings in the fiber, the gratings in the third pair being capable of substantially reflecting energy at a third wavelength corresponding to an order of Stoke shifted energy that is greater than the second wavelength, wherein no grating of the third pair is located between the gratings of the second pair.

30. A fiber laser system, comprising:

an energy source capable of producing pump energy;

a fiber coupled to the energy source so that the pump energy can be transferred from the energy source to the fiber, the fiber having a loop-shaped portion, a first non loop-shaped portion, and a second non loop-shaped portion;

a first fiber Bragg grating in the first non loop-shaped portion of the fiber, the first fiber Bragg grating being capable of substantially reflecting the pump energy;

a second fiber Bragg grating in the second non loop-shaped portion of the fiber, the second fiber Bragg grating being capable of substantially reflecting energy having a wavelength comprising a Stoke shifted wavelength; and a third fiber Bragg grating in the second non loop-shaped portion of the fiber, the third fiber Bragg grating being capable of substantially reflecting energy having a wavelength comprising a second Stoke shifted wavelength.

31. The system of claim 30 further comprising a fourth fiber Bragg grating in the second non loop-shaped portion of the fiber, the fourth fiber Bragg grating being capable of substantially reflecting energy having a wavelength comprising a third Stoke shifted wavelength.

* * * * *